(12) United States Patent
Wang

(10) Patent No.: US 11,356,831 B2
(45) Date of Patent: Jun. 7, 2022

(54) INFORMATION TRANSMISSION METHOD AND INFORMATION TRANSMISSION SYSTEM

(71) Applicant: CHICONY ELECTRONICS CO., LTD., New Taipei (TW)

(72) Inventor: Yi-Hung Wang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/134,784

(22) Filed: Dec. 28, 2020

(65) Prior Publication Data

US 2021/0321239 A1   Oct. 14, 2021

(30) Foreign Application Priority Data

Apr. 14, 2020 (TW) ................................ 109112542

(51) Int. Cl.
*H04W 4/80* (2018.01)
*H04W 84/12* (2009.01)
*H04W 76/10* (2018.01)

(52) U.S. Cl.
CPC ............. *H04W 4/80* (2018.02); *H04W 76/10* (2018.02); *H04W 84/12* (2013.01)

(58) Field of Classification Search
CPC ................................ H04W 4/80; H04W 76/10
See application file for complete search history.

(56) References Cited

U.S. PATENT DOCUMENTS

| 2004/0183785 | A1* | 9/2004 | Liu | ................. | G06F 3/0231 |
| | | | | | 345/168 |
| 2010/0265179 | A1 | 10/2010 | Ram | | |
| 2012/0210370 | A1* | 8/2012 | Kim | ................. | H04N 21/4788 |
| | | | | | 725/61 |

FOREIGN PATENT DOCUMENTS

TW        I221245       9/2004

* cited by examiner

*Primary Examiner* — Tuan H Nguyen
(74) *Attorney, Agent, or Firm* — Muncy, Geissler, Olds & Lowe, P.C.

(57) ABSTRACT

An information transmission system is formed by a plurality of input devices for the transmission of an information data, wherein each input device is signally connected to an electronic device. An information transmission method includes the following steps: one of the plurality of input devices receives a connection request from another input device; the input device receiving the connection request creates a wireless communication with the input device that issues the connection request according to the connection request; the input device receiving the connection request receives an information data transmitted by the input device that issues the connection request and transmits the information data to the electronic device connected to the input device that receives the connection request.

14 Claims, 8 Drawing Sheets

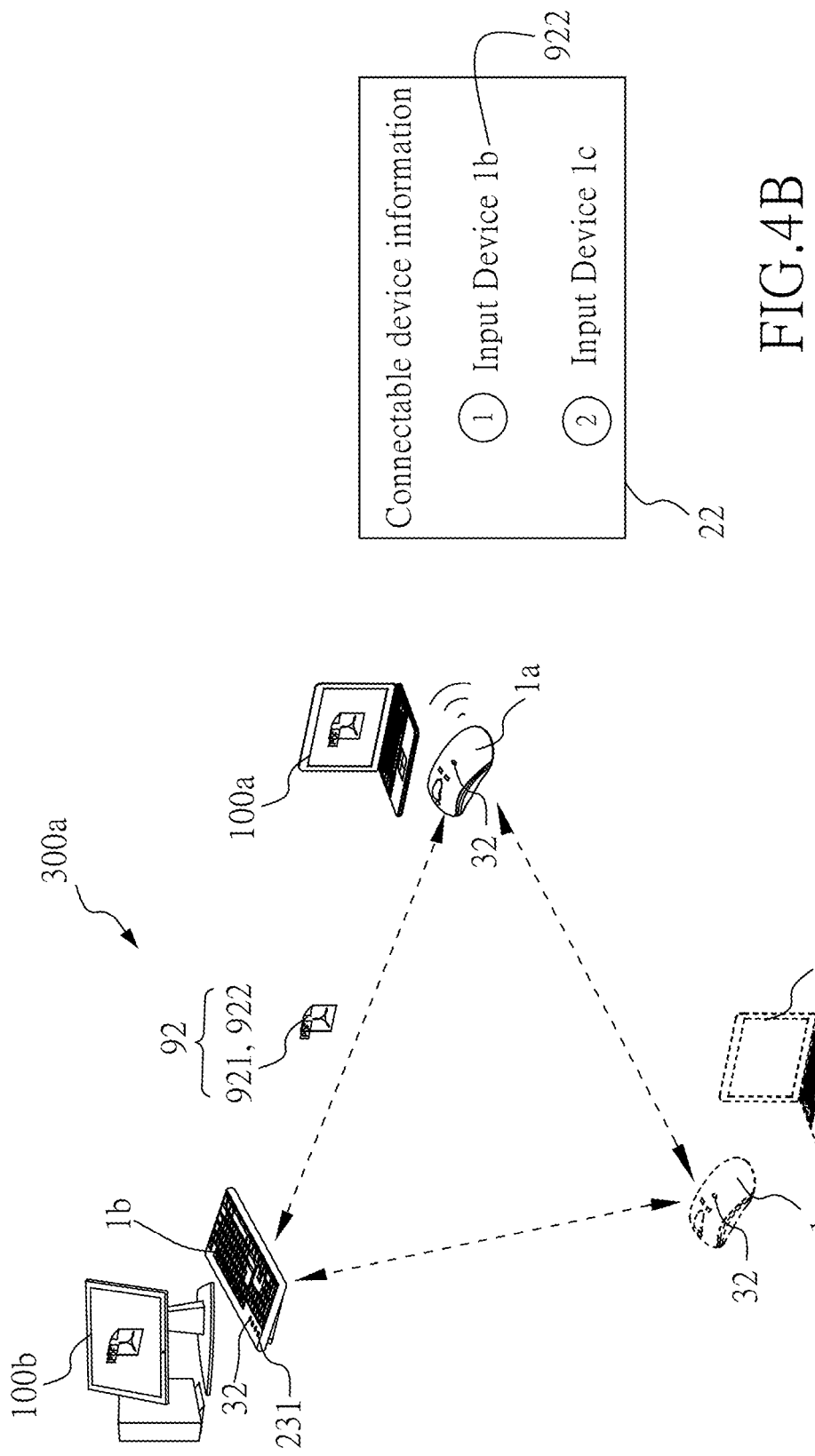

INFORMATION TRANSMISSION METHOD AND INFORMATION TRANSMISSION SYSTEM

BACKGROUND OF THE INVENTION

1. Field of the Invention

The present invention relates to an information transmission method and an information transmission system, particularly to an information transmission method and an information transmission system that uses input devices to transmit information data.

2. Description of the Related Art

With the vigorous development of wireless communication technology, the technology of using a wireless mouse or keyboard to control a paired electronic device or a wireless communication module through an electronic device/mobile device has been very popular. However, the pairing process for controlling two electronic devices at the same time is very complicated, and the current data transmission structure using wireless communication modules is mostly established between electronic devices (such as laptops, mobile devices or tablets). Because there is no wireless data transmission structure between input devices, it is necessary to provide a new input device pairing and wireless transmission method to increase the convenience of electronic device use.

SUMMARY OF THE INVENTION

It is a major objective of the present invention to provide an information transmission method that transmits information data by an input device.

It is another major objective of the present invention to provide an information transmission system that transmits information data by an input device.

To achieve the above objectives, the information transmission method of the present invention is used for an information transmission system. The information transmission system is formed by a plurality of input devices for transmitting an information data, wherein each of the input devices is signally connected to an electronic device. The information transmission method includes the following steps: one of the plurality of input device issues a connection request; one of the other input devices receives the connection request; the input device receiving the connection request creates a wireless communication with the input device that issues the connection request according to the connection request; the input device receiving the connection request receives an information data transmitted by the input device that issues the connection request and transmits the information data to the electronic device connected to the input device that receives the connection request.

The present invention further provides an information transmission system for transmitting an information data. The information transmission system includes a plurality of input devices. Each of the input devices includes an activation module, a wireless signal transceiving module, and a processing module. The activation module is used for generating a connection request. The wireless signal transceiving module is used for receiving or transmitting the connection request. The processing module is signally connected to the wireless signal transceiving module and the activation module, wherein the processing module of the input device receiving the connection request creates a wireless communication with the input device that issues the connection request according to the connection request to receive the information data transmitted by the input device that issues the connection request.

Through the information transmission system and information transmission method of the present invention, the wireless communication between the input devices is created such that an electronic device originally signally connected and controlled by one input device can be controlled by another input device. This simplifies the complicated pairing process of controlling multiple electronic devices by a single input device. In addition, a wireless ad hoc network formed by the input devices can transmit files from one electronic device to another through the communication nodes formed by the aforementioned input devices to provide a new message/file transmission mechanism for the wireless transmission architecture.

BRIEF DESCRIPTION OF THE DRAWINGS

FIG. 4A is a schematic diagram showing the use status of an information transmission system in a third embodiment of the present invention;

FIG. 4B is a schematic diagram of a device communication interface of the information transmission system in the third embodiment of the present invention;

DETAILED DESCRIPTION OF THE PREFERRED EMBODIMENT

Hereafter, the technical content of the present invention will be better understood with reference to preferred embodiments.

Figure 1:
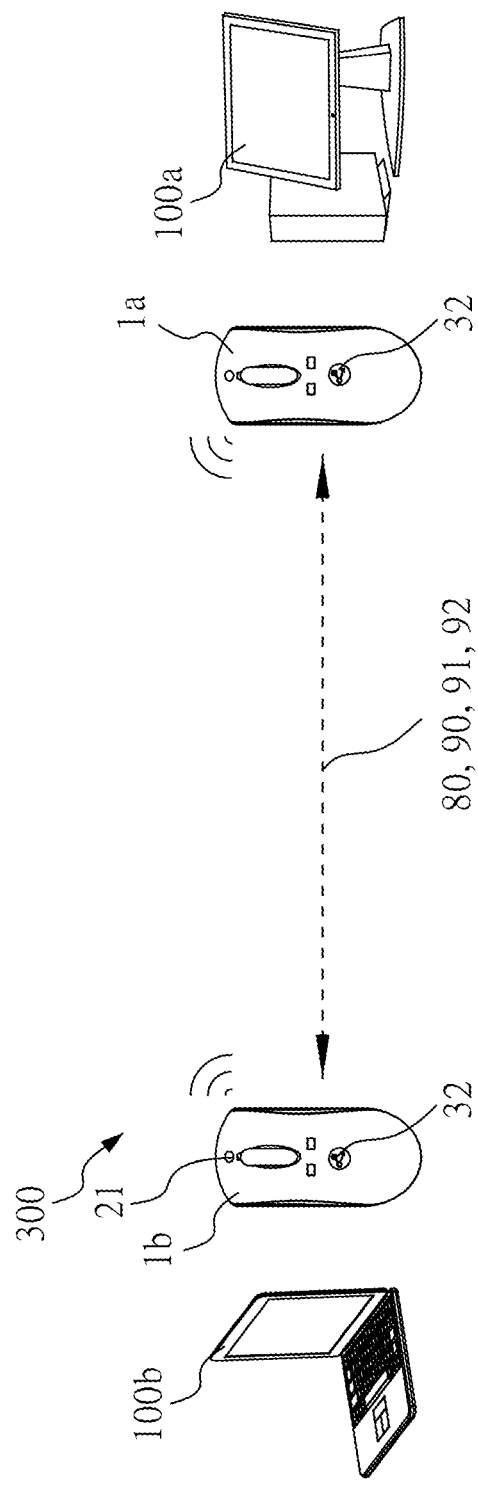
FIG. 1 is a schematic diagram showing the use status of an information transmission system in a first embodiment of the present invention.
Figure 2:
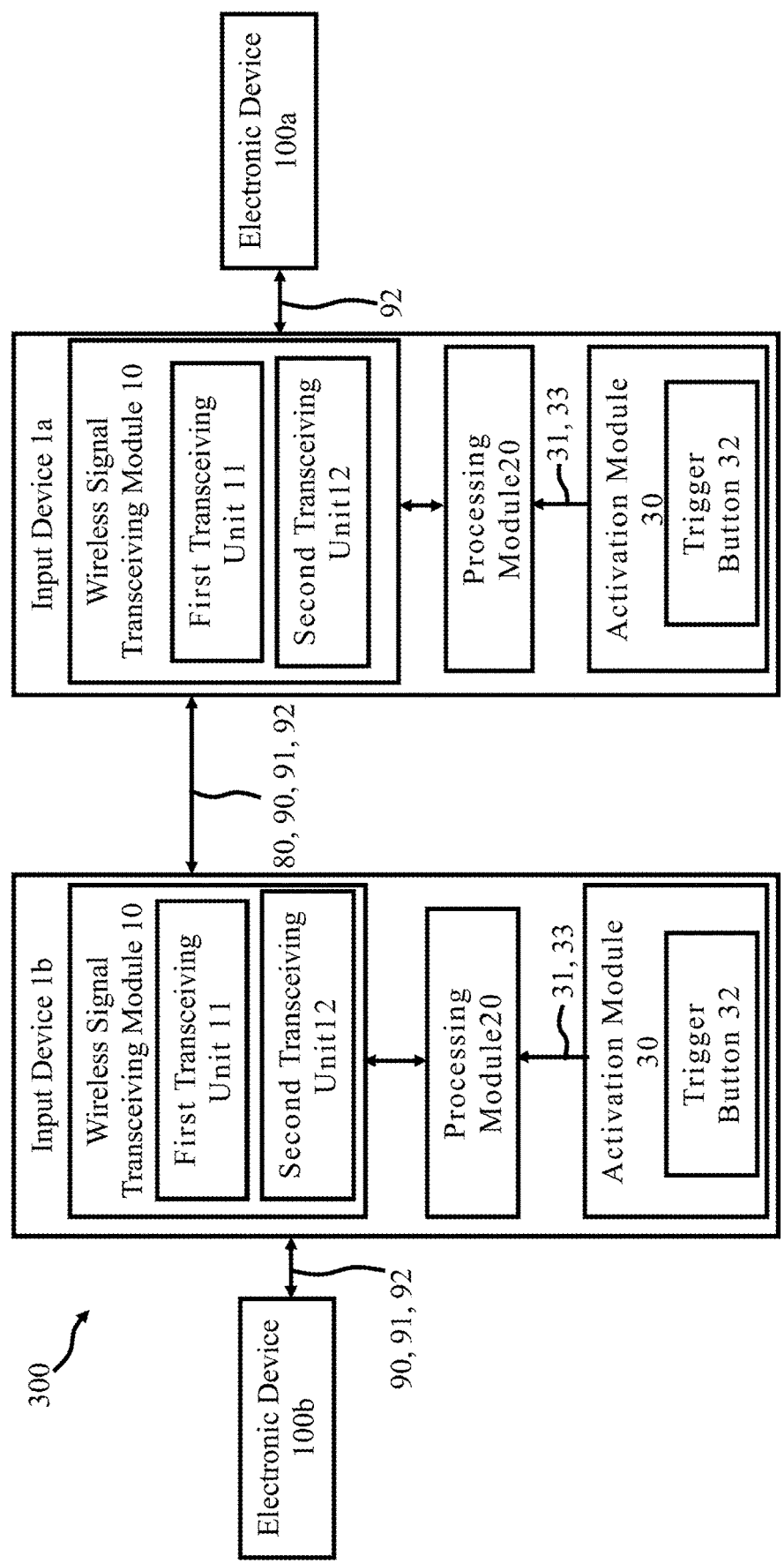
FIG. 2 is a hardware architecture diagram of the information transmission system in the first embodiment of the present invention.

FIG. 1 is a schematic diagram showing the use status of an information transmission system in a first embodiment of the present invention. FIG. 2 is a hardware architecture diagram of the information transmission system in the first embodiment of the present invention. As shown in FIG. 1 and FIG. 2, in the first embodiment of the present invention, an information transmission system 300 is formed by the input device 1a and the input device 1b through a wireless communication creation mechanism for transmitting an information data 90, wherein the input device 1a and the input device 1b are connected to the electronic device 100a and the electronic device 100b respectively through wireless transmission. The input device 1a controls the electronic device 100a, and the input device 1b controls the electronic device 100b. The information data 90 includes an electronic device operation instruction 91 and/or a file delivery information 92. In the present embodiment, each of the input device 1a and the input device 1b is a mouse, and the electronic device 100a and the electronic device 100b can be a desktop or a notebook computer.

As shown in FIG. 1 and FIG. 2, both the input device 1a and the input device 1b in the present embodiment include a wireless signal transceiving module 10, a processing module 20, and an activation module 30. The wireless signal transceiving module 10 and the activation module 30 are electrically connected to the processing module 20. The activation module 30 includes a trigger button 32. According to an embodiment of the present invention, the wireless signal transceiving module 10 includes a first transceiving unit 11 and a second transceiving unit 12, wherein the first transceiving unit 11 is a wireless network module that can support the 802.11 wireless network standard or a Wi-Fi standard for wireless communication between the input device 1a and the input device 1b. The second transceiving unit 12 is a Bluetooth module or RF (radio frequency) module for wireless communication between the input device 1a and the electronic device 100a and the input device 1b and the electronic device 100b to perform data transmission or data exchange between the input devices 1a, 1b and the electronic devices 100a, 100b. The processing module 20 is a data processing chip. The activation module 30 may be a hardware device, software program, firmware, or a combination thereof.

Figure 3A:
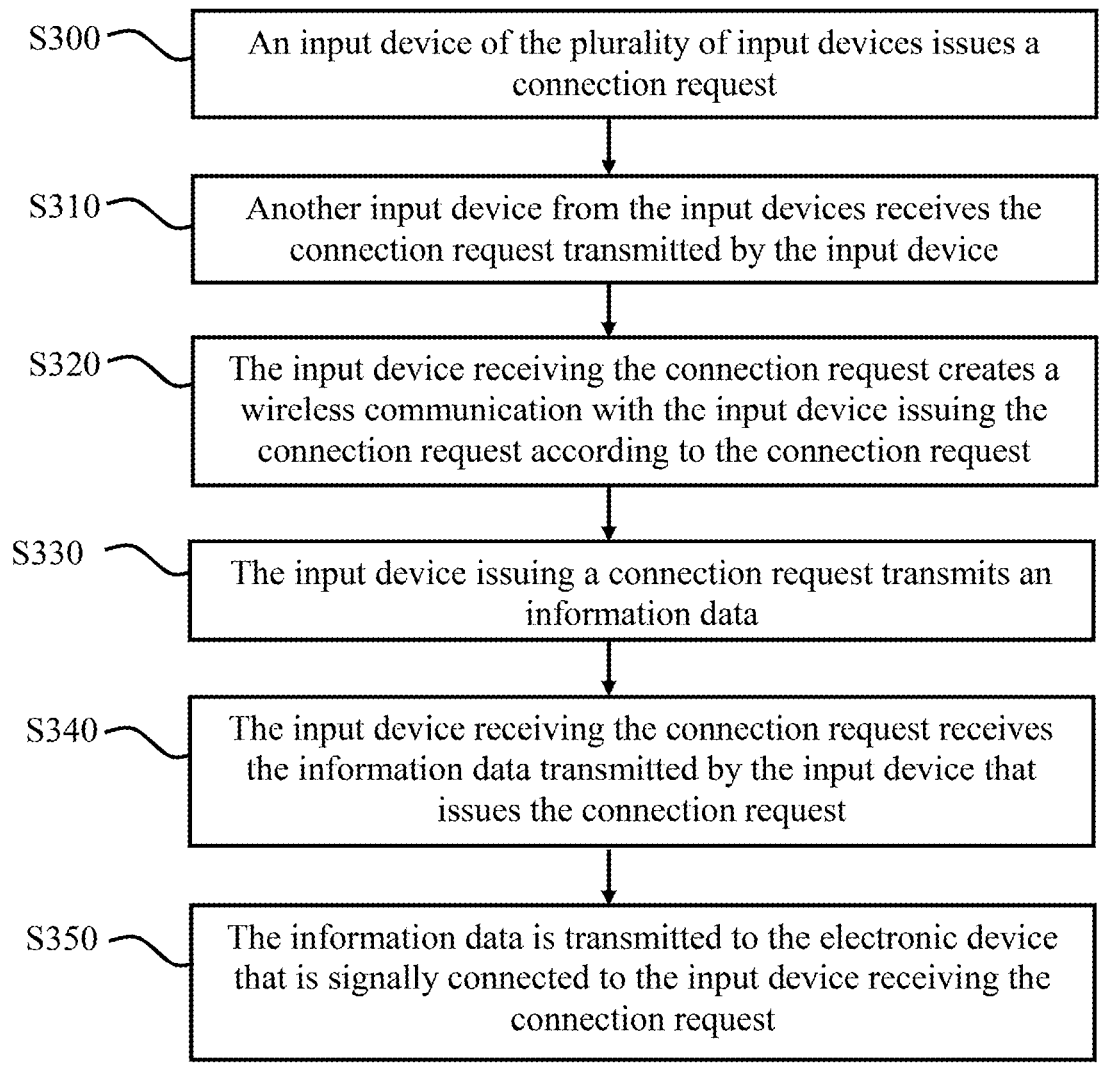
FIG. 3A is a flowchart showing steps of an information transmission method in the first embodiment of the present invention.

FIG. 3A is a flowchart showing steps of an information transmission method in the first embodiment of the present invention. Please refer to FIG. 1, FIG. 2 and FIG. 3A. The information transmission method of the present invention is applied to the information transmission system 300. The following steps are explained further in accordance with the information transmission method.

In Step S300: An input device 1a of the plurality of input devices 1a, 1b issues a connection request 80.

The user of the input device 1a presses a trigger button 32 of the input device 1a to trigger the activation module 30 to generate the connection request 80, and the connection request 80 is transmitted through the wireless signal transceiving module 10 of the input device 1a. In some embodiments, when the user presses the trigger button 32 of the activation module 30, the wireless signal transceiving module 10 first searches for and recognizes nearby connectable input devices and then transmits the connection request.

In Step S310: Another input device 1b from the input devices 1a, 1b receives the connection request 80 transmitted by the input device 1a.

In the present embodiment, the wireless signal transceiving module 10 of the input device 1b receives the connection request 80 transmitted by the input device 1a.

In Step S320: The input device 1b receiving the connection request 80 creates a wireless communication with the input device 1a that issues the connection request 80 according to the connection request 80.

After the wireless signal transceiving module 10 of the input device 1b receives the connection request 80 transmitted by the input device 1a, the processing module 20 of the input device 1b creates a wireless communication between the input device 1b and the input device 1a according to the connection request 80.

In Step 330: The input device 1a issuing the connection request 80 transmits an information data 90.

The wireless signal transceiving module 10 of the input device 1a transmits the information data 90. In the present embodiment, the information data 90 transmitted by the input device 1a is an electronic device operation instruction 91.

In Step S340: The input device 1b receiving the connection request 80 receives the information data 90 transmitted by the input device 1a that issues the connection request 80.

The wireless signal transceiving module 10 of the input device 1b receives the information data 90 transmitted by the input device 1a.

In Step S350: The information data 90 is transmitted to the electronic device 100b that is signally connected to the input device 1b receiving the connection request 80.

The wireless signal transceiving module 10 of the input device 1b transmits the information data 90 to the corresponding electronic device 100b. Specifically, after the wireless communication between the input device 1b and the input device 1a is created, the user can control the electronic device 100b by operating the input device 1a. At this time, the electronic device operation instruction 91 generated by the user operating the input device 1a will be transmitted to the input device 1b via the wireless signal transceiving module 10 of the input device 1a. Then the input device 1b transmits the received electronic device operation instruction 91 to the electronic device 100b, so that after the creation of the wireless communication between the input device 1b and the input device 1a, the user can employ the input device 1a to control the electronic device 100b that is originally controlled by the input device 1b.

Figure 3B:
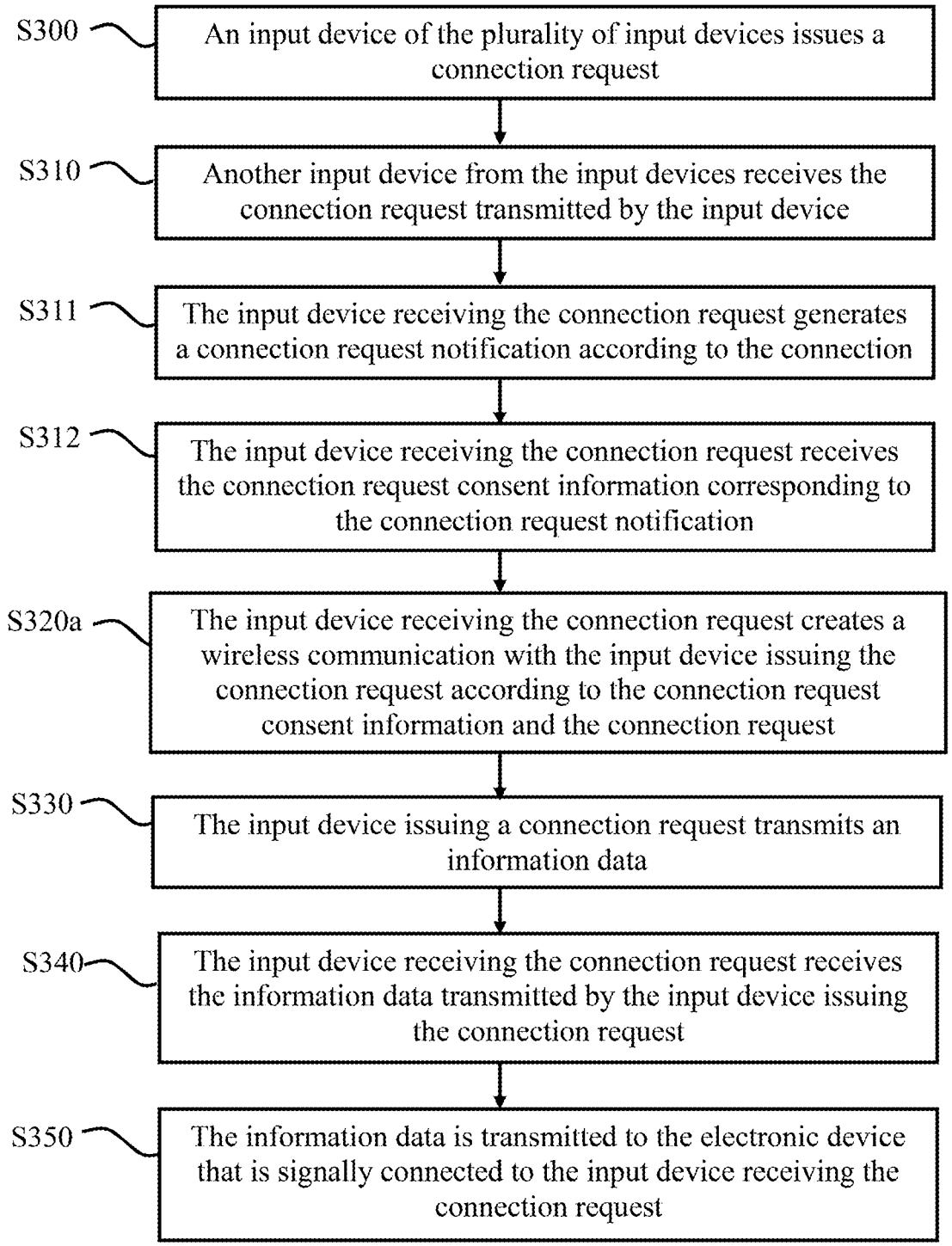
FIG. 3B is a flowchart showing steps of an information transmission method in a second embodiment of the present invention.

FIG. 3B is a flowchart showing steps of an information transmission method in a second embodiment of the present invention, which can be applied to the information transmission system 300 as shown in FIG. 1 and FIG. 2. Please refer to FIG. 1, FIG. 2, FIG. 3A and FIG. 3B. Steps S300, S310, S330, S340 and S350 of the information transmission method in the present embodiment are the same as Steps S300, S310, S330, S340 and S350 of the first embodiment, which can be referenced and are not further described herein. The difference from the embodiment shown in FIG. 3A is that the information transmission method of the present embodiment further includes Step S311, Step S312 and Step S320a shown in FIG. 3B.

In Step S311: The input device 1b receiving the connection request 80 generates a connection request notification 21 according to the connection request 80.

As shown in FIG. 1 and FIG. 2, in the present embodiment, before the processing module 20 of the input device 1b creates a wireless communication between the input device 1b and the input device 1a according to the connection request 80, the processing module 20 of the input device 1b will first generate a connection request notification 21 based on the received connection request 80 to inform users. Specifically, the connection request notification 21 can be expressed by the processing module 20 notifying the user that the input device 1b has received a connection request 80 through a flashing indicator light. In some embodiments, the connection request notification 21 can also be expressed in other ways (such as the vibration of the input device), but it is not limited thereto.

In Step S312: The input device 1b receiving the connection request 80 receives the connection request approval information 31 corresponding to the connection request notification 21.

At this time, the user can press the trigger button 32 of the input device 1b to trigger the activation module 30 to generate the connection request approval information 31 corresponding to the current connection request notification 21.

In Step S320a: The input device 1b receiving the connection request 80 creates a wireless communication with the input device 1a that issues the connection request 80 according to the connection request approval information 31 and the connection request 80.

The wireless signal transceiving module 10 of the input device 1b transmits the connection request 80 to the processing module 20 of the input device 1b. After receiving the connection request approval information 31, the processing module 20 creates a wireless communication between the input device 1b and the input device 1a according to the connection request approval information 31 and the connection request 80. In the process, users only need to press the trigger button 32 of the input device 1a and the input device 1b to create a wireless communication between the input device 1a and the input device 1b. This simplifies the complicated pairing process for a single input device to control multiple electronic devices.

It should be noted here that in the present embodiment, the activation module 30 is triggered by pressing the trigger button 32 of the input device 1a to generate a connection request 80. In some embodiments, the activation module 30 can be triggered in other ways (such as the amount of displacement of a mouse) to generate the connection request 80, but it is not limited thereto.

Hereafter please refer to both FIG. 4A and FIG. 4B, which present schematic diagrams showing the use status of an information transmission system and a device communication interface in a third embodiment of the present invention.

As shown in FIG. 4A, in the third embodiment, the information transmission system 300a is a wireless ad hoc network system formed by the plurality of input devices via the wireless communication creation mechanism presented in the foregoing embodiment. In the present embodiment, the wireless ad hoc network system includes a plurality of communication nodes, where the communication nodes are the input devices. The input devices can be a mouse or a keyboard, and they are wirelessly connected to each other. The information transmission system 300a can include, for example, an input device 1a, an input device 1b and an input device 1c, and the input device 1a, input device 1b, and input device 1c are wirelessly connected to one another. According to an embodiment of the present invention, the processing module 20 of the input device 1a generates a device communication interface 22 on the corresponding electronic device 100a to display the input device that can be connected to the input device 1a via wireless communication, as shown in FIG. 4B. The device communication interface 22 of the electronic device 100a displays the connectable devices of the current input device 1a, including input device 1b and input device 1c, for users to choose for information data 90 transmission of the information transmission system 300a. In the present embodiment, the information data 90 is a file delivery information 92.

Specifically, as shown in FIG. 4A, the wireless ad hoc network system is based on the wireless signal transceiving module 10 of the input device and is formed by dynamically connecting the input device with one or more input devices. In the wireless ad hoc network system 300a, an input device is a communication node in the wireless ad hoc network system 300a. Each of the input devices (communication nodes) has the ability to transmit or receive network packets or to provide routing nodes for relaying network packets to other nodes.

Figure 5A:
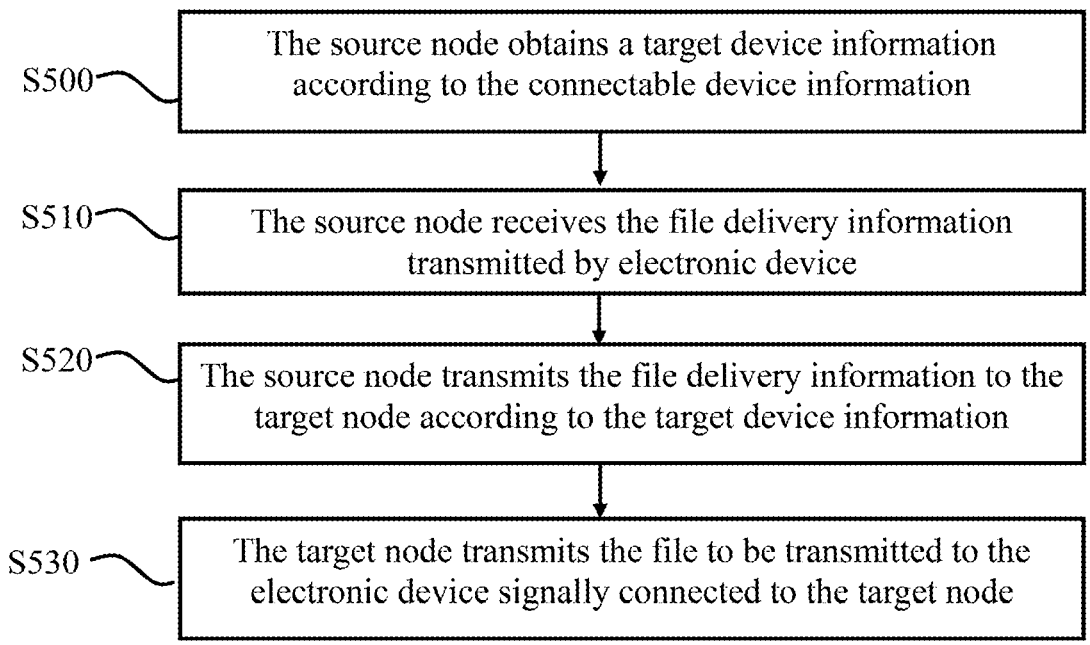
FIG. 5A is a flowchart showing steps of an information transmission method in the third embodiment of the present invention.

FIG. 5A is a flowchart showing steps of an information transmission method in a third embodiment of the present invention. The information transmission method can be applied to the information transmission system 300a in FIG. 4A. Thus, please hereafter refer to both FIG. 4A and FIG. 4B.

In Step S500: The source node obtains a target device information 922 according to the connectable device information.

The preferred embodiment is that when a user of the input device 1a wants to transmit a file delivery information 92 through the information transmission system 300a, the user can first press the trigger button 32 of the input device 1a to activate the device communication interface 22 of the corresponding electronic device 100a and display the device communication interface 22 on a screen of the electronic device 100a. The device communication interface 22 displays the connectable device information of the input device 1a for users to select the target input device to transmit the file delivery information 92. The connectable device information displayed in the device communication interface 22 of the electronic device 100a is the connectable input device in the wireless communication range of the input device 1a. In the present embodiment, the input devices that can be connected in the wireless communication range of the input device 1a include the input device 1b and the input device 1c, and the user selects the input device 1b as the target input device for the file delivery information 92. In other words, when a user of the input device 1a transmits the file delivery information 92 to the input device 1b through the information transmission system 300a, the input device 1a is the source node and the input device 1b is the target node. After the user selects the input device 1b as the target node, a target device information 922 can be obtained, and the target device information 922 includes the target node address. For example, the node address can be the network protocol address (Internet Protocol Address, or IP address) of the input device. The input device 1a obtains the target device information 922 and then transmits the target device information 922 to the electronic device 100a.

In Step S510: The source node receives the file delivery information 92 transmitted by the electronic device 100a.

A second transceiving unit 12 of the wireless signal transceiving module 10 of the input device 1a (source node) receives the file delivery information 92 transmitted by the electronic device 100a. Specifically, the file delivery information 92 includes a file to be transmitted 921 and a target device information 922. In the present embodiment, the target device information 922 includes a node address of the input device 1b (target node). In some embodiments, the target device information 922 may include a source node address and a target node address, but it is not limited thereto.

In Step S520: The source node transmits the file delivery information 92 to the target node according to the target device information 922.

The processing module 20 of the input device 1a (source node) transmits the file delivery information 92 to the first transceiving unit 11 of the input device 1b (target node) according to the target device information 922 (node address of the target node) via the first transceiving unit 11 of the wireless signal transceiving module 10. At this time, the processing module 20 of the input device 1b determines whether the target device information 922 of the file delivery information 92 includes its own node address. If it is determined that the target device information 922 is its own node address, the processing module 20 of the input device 1b (target node) receives the file to be transmitted 921.

In Step S530: The target node transmits the file to be transmitted 921 to the electronic device 100b signally connected to the target node.

The processing module 20 of the input device 1b transmits the file to be transmitted 921 to the electronic device 100b (the electronic device corresponding to the target node) through the second transceiving unit 12 of the wireless signal transceiving module 10.

Figure 5B:
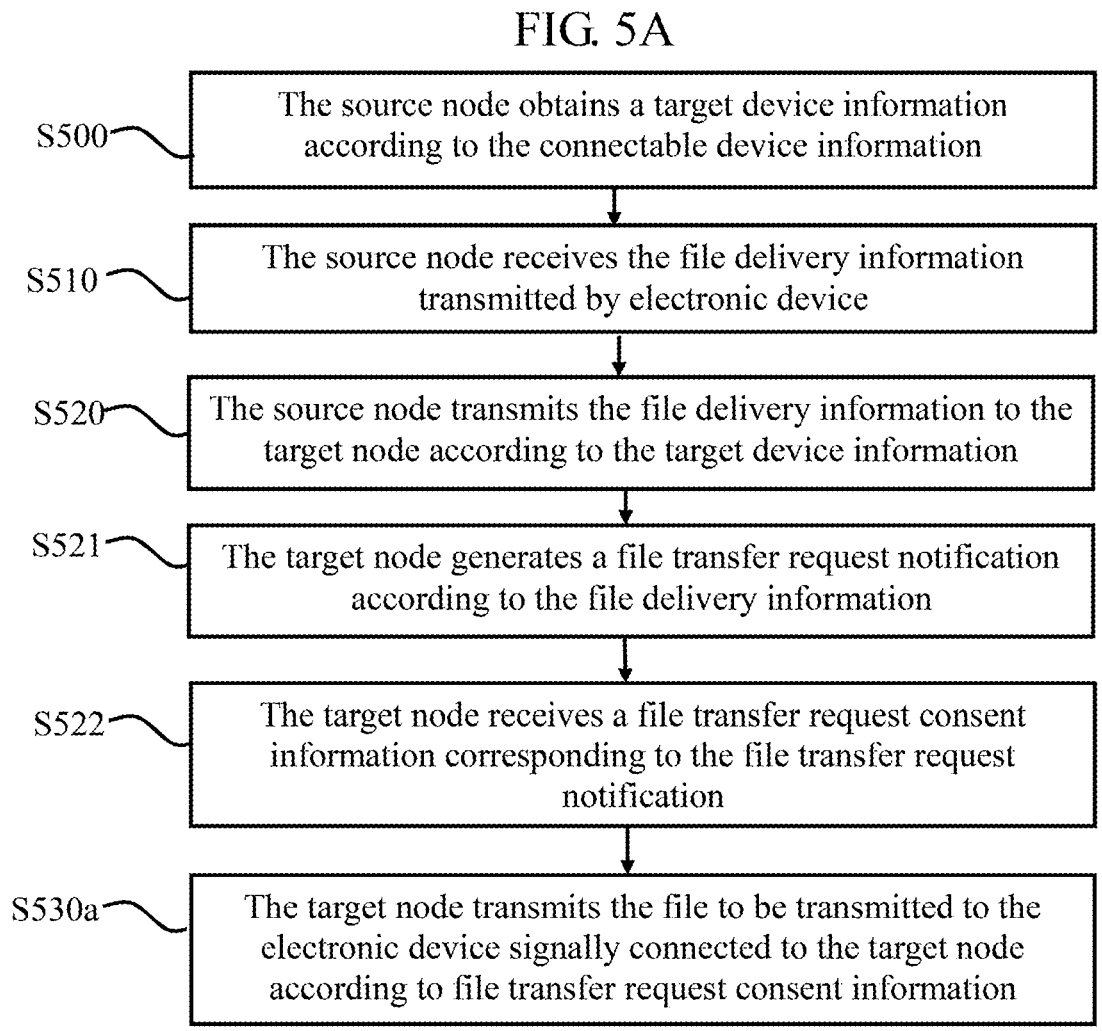
FIG. 5B is a flowchart showing steps of an information transmission method in a fourth embodiment of the present invention.

FIG. 5B is a flowchart showing steps of an information transmission method in a fourth embodiment of the present invention, which is applied to the information transmission system 300a of FIG. 4A. Thus, please refer to both FIG. 4A and FIG. 4B. Steps S500, S510, and S520 of the information transmission method in the present embodiment are the same as Steps S500, S510, and S520 of FIG. 5A, and they are not further described herein. The difference from the embodiment shown in FIG. 5A is that the information transmission method of the present embodiment further includes Step S521, Step S522 and Step S530a.

In Step S521: The target node generates a file transfer request notification 231 according to the file delivery information 92.

In the present embodiment, the processing module 20 of the input device 1b determines whether the target device information 922 of the file delivery information 92 includes its own node address. If it is determined that the target device information 922 is its own node address, the processing module 20 generates a file transfer request notification 231 according to the file delivery information 92. In the present embodiment, the specific expression of the file transfer request notification 231 is that the processing module 20 of the input device 1b notifies the user of the input device 1b through the blinking indicator light that it has received the file delivery information 92.

In Step S522: The target node receives a file transfer request approval information 33 corresponding to the file transfer request notification 231.

At this time, the user can press the trigger button 32 of the input device 1b to trigger the activation module 30 to generate the corresponding file transfer request approval information 33.

In Step S530a: The target node transmits the file to be transmitted 921 to the electronic device 100b signally connected to the target node according to file transfer request approval information 33.

After receiving the file transfer request approval information 33 from the processing module 20 of the input device 1b, the processing module 20 transmits the file to be transmitted 921 to the electronic device 100b through the second transceiving unit 12 of the wireless signal transceiving module 10.

Figure 6A:
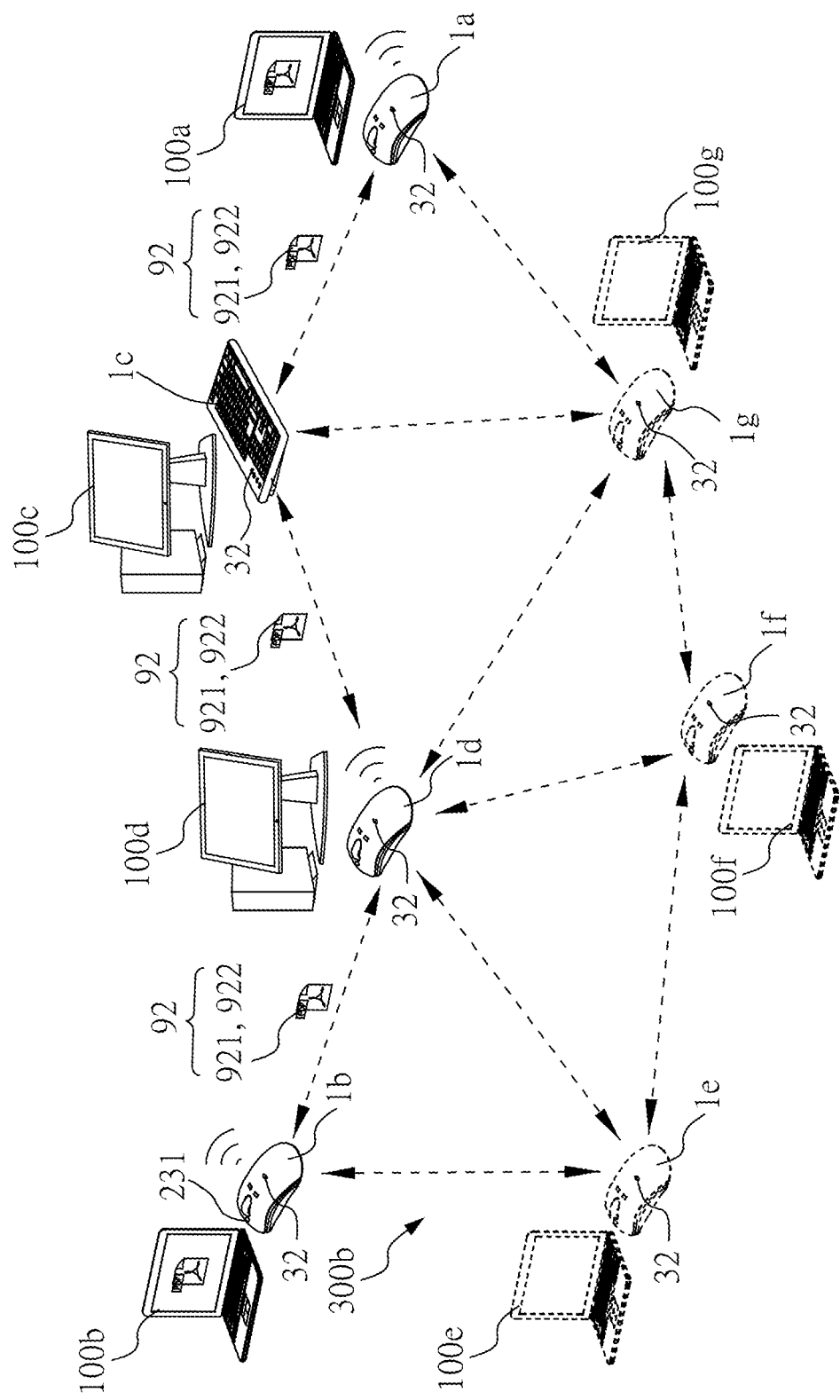
FIG. 6A is a schematic diagram showing the use status of an information transmission system in a fifth embodiment of the present invention.
Figure 6B:
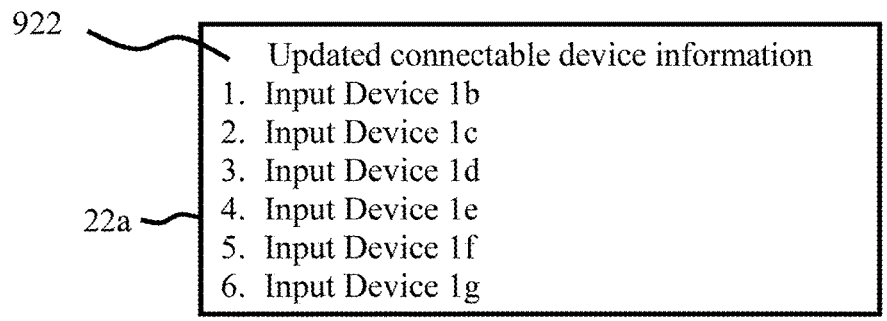
FIG. 6B is a schematic diagram of the updated connectable device communication interface of the information transmission system in the fifth embodiment of the present invention.

FIG. 6A is a schematic diagram showing the use status of an information transmission system in a fifth embodiment of the present invention. FIG. 6B is a schematic diagram of the updated connectable device communication interface of the information transmission system in the fifth embodiment of the present invention.

In the fifth embodiment, as shown in FIG. 6A and FIG. 6B, the information transmission system 300b includes a plurality of input devices. In the present embodiment, the input devices can be, for example, a mouse or a keyboard. In the present embodiment, the user wants to transmit the file delivery information 92 to the input device 1b through the input device 1a; that is, the input device 1a is a source node and the input device 1b is a target node. As the input device 1b is not a connectable input device within the wireless communication range of the input device 1a, the user can transmit the file delivery information 92 from the input device 1a to the input device 1b through the input device 1c-1g (relay node) between the input device 1a and the input device 1b.

Further, since each input devices 1a-1g has its own connectable device information, the connectable device information of each input devices 1a-1g includes the input device with which each input devices 1a-1g can be connected within their respective wireless communication range. For example, input devices that can be connected in the wireless communication range of the input device 1a include the input device 1c and input device 1g. Input devices that can be connected in the wireless communication range of the input device 1c include the input device 1a, input device 1d and input device 1g. Input devices that can be connected in the wireless communication range of the input device 1d include the input device 1b, input device 1c, input device 1e, input device 1f and input device 1g. Input devices that can be connected in the wireless communication range of the input device 1g include the input device 1a, input device 1c, input device 1d and input device 1f Input devices that can be connected in the wireless communication range of the input device 1f include the input device 1d, input device 1e and input device 1g. Input devices that can be connected in the wireless communication range of the input device 1e include the input device 1b, input device 1d and input device 1f Input devices that can be connected in the wireless communication range of the input device 1b include the input device 1d and input device 1e.

Figure 7:
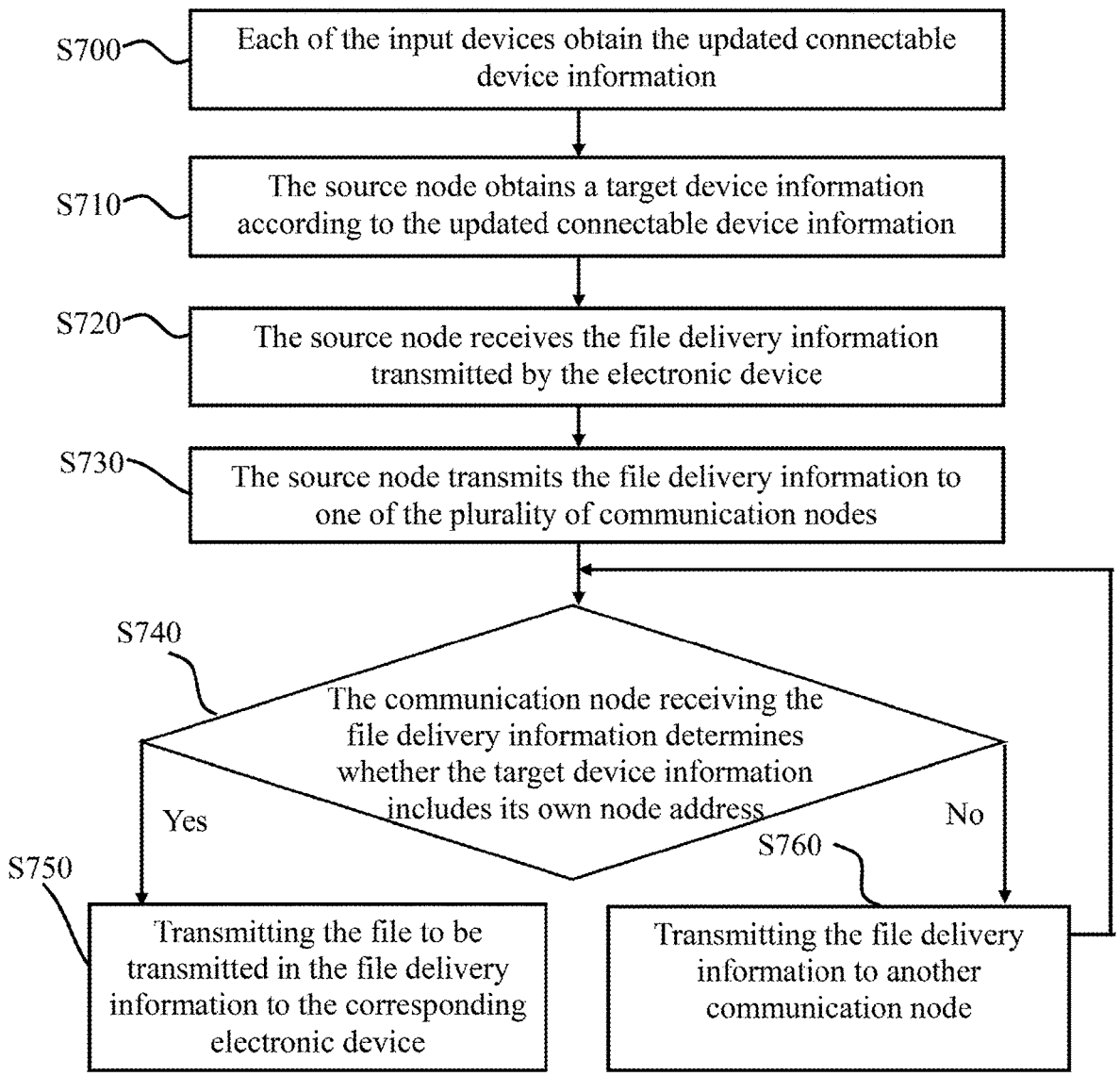
FIG. 7 is a flowchart showing steps of an information transmission method in the fifth embodiment of the present invention.

Hereafter please refer to FIG. 6A, FIG. 6B and FIG. 7. FIG. 7 is a flowchart showing steps of an information transmission method in a fifth embodiment of the present invention. The information transmission method of the present embodiment includes Steps S700, S710, S720, S730, S740, 750 and S760.

In Step S700: Each of the input devices obtains the updated connectable device information.

According to an embodiment of the present invention, the input devices 1a-1g can exchange their connectable device information through the information transmission system 300b. After exchanging connectable device information, each of the input devices 1a-1g obtains an updated connectable device information according to its own connectable device information and the exchangeable connectable device information, and obtains the connectable relationship between each input device from the updated connectable device information. In some embodiments, the processing module 20 of each input device controls the wireless signal transceiving module 10 to search for the neighboring input device and identify it first, and then the connectable device information of each of the devices is exchanged through the information transmission system 300b to obtain an updated connectable device information.

For example, after receiving the updated connectable device information, the input device 1a displays this update on the device communication interface 22a of its corresponding electronic device 100a. It includes the input device 1c and the input device 1g in the wireless communication range of the input device 1a and can also include the input device 1b, the input device 1d, the input device 1e, and the input device 1f that are not in the wireless communication range of the input device 1a. Therefore, by updating the connectable device information, the user can select the input device 1c and the input device 1g in the wireless communication range of the input device 1a for file transmission and can further select the input device 1b, input device 1d, input device 1e and input device 1f for file transmission. That is, in the present embodiment, the input device 1b, input device 1d, input device 1e, and input device 1f that were not in the wireless communication range of the input device 1a can be used as the selected input device.

In Step S710: The source node obtains a target device information 922 according to the updated connectable device information.

The user selects the input device 1b as the target node for file transmission through the updated connectable device information displayed on the screen of the electronic device 100a corresponding to the input device 1a (source node). The input device 1a obtains a target device information 922 according to the updated connectable device information. The target device information 922 includes a node address of the input device 1b (target node). The input device 1a can also transmit the target device information 922 to the electronic device 100a.

In Step S720: The source node receives the file delivery information 92 transmitted by the electronic device 100a.

The second transceiving unit 12 of the wireless signal transceiving module 10 of the input device 1a receives the file delivery information 92 transmitted by the electronic device 100a to which it is signally connected. Specifically, the file delivery information 92 includes a file to be transmitted 921 and a target device information 922.

In Step S730: The source node transmits the file delivery information 92 to one of the plurality of communication nodes.

For example, the first transceiving unit 11 of the wireless signal transceiving module 10 of the input device 1a transmits the file delivery information 92 to the input device 1c in the wireless communication range of the input device 1a.

In Step S740: The communication node receiving the file delivery information 92 determines whether the target device information 922 includes its own node address.

When the first transceiving unit 11 of the wireless signal transceiving module 10 of the input device 1c (communication node) receives the file delivery information 92 transmitted by the input device 1a (source node), the processing module 20 of the input device 1c determines whether the target device information 922 of the file delivery information 92 includes the node address of the input device 1c itself. If yes, the input device 1c is the input device (target node) that should receive the file and transmits the file to be transmitted 921 in the file delivery information 92 to its corresponding electronic device 100c (Step S750). If not, the first transceiving unit 11 of the wireless signal transceiving module 10 of the input device 1c transmits the file delivery information 92 to another communication node (Step S760). At this time, the input device 1c is a relay node.

For example, in the present embodiment, the target device information 922 includes the node address of the input device 1b (target node). Therefore, the input device 1c determines that the target device information 922 does not match its own node address, and the first transceiving unit 11 of its wireless signal transceiving module 10 transmits the file delivery information 92 to the input device 1d (another communication node). Then (returning to Step S740), after the first transceiving unit 11 of the wireless signal transceiving module 10 of the input device 1d receives the file delivery information 92, the processing module 20 determines whether the target device information 922 of the file delivery information 92 includes its own node address. Since the target device information 922 includes the node address of the input device 1b, the input device 1d determines that the target device information 922 does not match its own node address, and the first transceiving unit 11 of the wireless signal transceiving module 10 transmits the file delivery information 92 to another input device 1b in the wireless communication range of the input device 1d. At this time, the input device 1d is also a relay node.

Then as shown in FIG. 2, FIG. 6A and FIG. 7, the first transceiving unit 11 of the wireless signal transceiving module 10 of the input device 1d transmits the file delivery information 92 to the input device 1b. The processing module 20 of the input device 1b determines whether the target device information 922 of the file delivery information 92 includes its own node address (Step S740). Since the target device information 922 includes the node address of the input device 1b, the input device 1b determines that the target device information 922 matches its own node address, and the input device 1b transmits the file 921 to be transferred to the corresponding electronic device 100b (Step S750).

It should be noted that when a combination of relay nodes (1c-1g) can be used to allow the source node to transmit the file to be transmitted 921 to the target node (that is, there are multiple transmission paths), the source node and relay node can dynamically select the relay node (that is, choose a different transmission path) according to the signal quality parameters or the minimum number of nodes (the shortest transmission path) to transmit the file delivery information 92.

Through the information transmission system and information transmission method of the present invention, a wireless communication between the input device 1a and the input device 1b can be created so that the electronic device 100b originally signally connected to the input device 1b can be controlled by the input device 1a. This simplifies the complicated pairing process of controlling multiple electronic devices with a single input device. In addition, the wireless ad hoc network formed by the input devices 1a, 1b, 1c, 1d, 1e, 1f, and 1g can transmit files from the electronic device 100a to the electronic device 100b via the aforementioned input device serving as a communication node of a wireless ad hoc network. This also provides a new message/file transmission mechanism for the existing wireless transmission architecture.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An information transmission method for an information transmission system, wherein the information transmission system is formed by a plurality of input devices for the transmission of an information data, and each of the input devices is signally connected to an electronic device, the information transmission method comprising the following steps:
- one of the plurality of input devices issues a connection request;
- another of the input devices receives the connection request;
- the input device receiving the connection request creates a wireless communication with the input device that issues the connection request according to the connection request;
- the input device issuing the connection request transmits the information data;
- the input device receiving the connection request receives the information data; and
- the information data is transmitted to the electronic device that is signally connected to the input device receiving the connection request, wherein the information data is an electronic device operation instruction and the input device that issues the connection request controls the electronic device signally connected to the input device receiving the connection request with the electronic device operation instruction.

2. The information transmission method as claimed in claim 1, wherein before the input device issues the connection request, the information transmission method further comprises the following step:
- the input device searches for and identifies another connectable input device within a wireless communication range.

3. An information transmission method for an information transmission system, wherein the information transmission system is formed by a plurality of input devices for the transmission of an information data, and each of the input devices is signally connected to an electronic device, the information transmission method comprising the following steps:
- one of the plurality of input devices issues a connection request;
- another of the input devices receives the connection request;
- the input device receiving the connection request generates a connection request notification according to the connection request;
- the input device receiving the connection request receives a connection request approval information corresponding to the connection request notification;
- the input device receiving the connection request creates a wireless communication with the input device that issues the connection request according to the connection request approval information and the connection request;
- the input device issuing the connection request transmits the information data;
- the input device receiving the connection request receives the information data; and
- the information data is transmitted to the electronic device that is signally connected to the input device receiving the connection request.

4. An information transmission method, applied to an information transmission system, wherein the information transmission system is formed by a plurality of input devices for the transmission of an information data and the information transmission system is a wireless ad hoc network system, which includes a plurality of communication nodes, wherein each of the communication nodes has a node address, the plurality of communication nodes is the plurality of input devices, the plurality of communication nodes includes a source node and a target node, the information data is a file delivery information and the file delivery information includes a file to be transmitted and a target device information, and the target device information is a target node address, the information transmission method further comprising the following steps:
- the source node receives the file delivery information transmitted by the electronic device that is signally connected to the source node;
- the source node transmits the file delivery information to one of the plurality of communication nodes;
- the communication node receiving the file delivery information determines whether its own node address matches the target node address; and
- if yes, the communication node is the target node, and the target node transmits the file to be transmitted to the electronic device that is signally connected to the target node.

5. The information transmission method as claimed in claim 4, wherein before the target node transmits the file to be transmitted to the electronic device signally connected to the target node, the information transmission method further comprising the following steps:
- the target node issues a file transfer request notification according to the file delivery information;
- the target node receives a file transfer request approval information corresponding to the file transfer request notification; and
- the target node transmits the file to be transmitted to the electronic device signally connected to the target node according to the file transfer request approval information.

6. The information transmission method as claimed in claim 4, wherein before the source node receives the file delivery information transmitted by the electronic device that is signally connected to the source node, the information transmission method further comprising the following steps:
- each of the input devices obtains an updated connectable device information; and
- the source node obtains the target device information according to the updated connectable device information.

7. The information transmission method as claimed in claim 4, wherein the plurality of communication nodes further comprise a relay node, the information transmission method further comprising the following step: when the communication node receiving the file delivery information determines that its own node address does not match the target node, the communication node is the relay node, and the relay node transmits the file delivery information to another communication node of the plurality of communication nodes.

8. An information transmission system for the transmission of an information data, the information transmission system comprising:
- a plurality of input devices and each of the input devices is signally connected to an electronic device, all of the input devices comprising:
- an activation module for generating a connection request;
- a wireless signal transceiving module for receiving or transmission of the connection request and/or the information data; and
- a processing module, signally connected to the wireless signal transceiving module and the activation module, wherein the processing module of the input device receiving the connection request creates a wireless communication with the input device issuing the connection request according to the connection request to receive the information data transmitted by the input device that issues the connection request, wherein the information data is an electronic device operation instruction, and the input device that issues the connection request controls the electronic device signally connected to the input device receiving the connection request with the electronic device operation instruction.

9. The information transmission system as claimed in claim 8, wherein the activation module generates a connection request notification according to the connection request and receives a connection request notification information corresponding to the connection request notification, and after the connection request approval information is received, the connection request approval information is transmitted to the processing module, such that the processing module creates the wireless communication with the input device issuing the connection request according to the connection request approval information and the connection request.

10. An information transmission system, wherein the information transmission system is formed by a plurality of input devices for the transmission of an information data and the information transmission system is a wireless ad hoc network system which includes a plurality of communication nodes, wherein each of the communication nodes has a node address, the plurality of communication nodes is the plurality of input devices, each of the input devices is signally connected to an electronic device, the plurality of communication node includes a source node and a target node, the information data is a file delivery information and the file delivery information includes a file to be transmitted and a target device information, and the target device information is a target node address, wherein the source node receives the file delivery information transmitted by the electronic device that is signally connected to the source node and transmits the file delivery information to one of the plural communication nodes.

11. The information transmission system as claimed in claim 10, wherein the processing module of the communication node receiving the file delivery information determines whether the node address itself matches the target node address; if yes, the communication node is the target node, and the wireless signal transceiving module of the target node transmits the file to be transmitted to the electronic device that is signally connected to the target node.

12. The information transmission system as claimed in claim 11, wherein before the target node transmits the file to be transmitted to the electronic device that is signally connected to the target node, the processing module of the target node transmits a file transfer request notification according to the file delivery information and receives a file transfer request approval information corresponding to the file transfer request notification, and the processing module of the target node transmits the file to be transmitted to the electronic device signally connected to the target node according to the file transfer request approval information.

13. The information transmission system as claimed in claim 10, wherein the plurality of communication nodes further comprises a relay node; if the processing module of the communication node receiving the file delivery information determines its own node address does not match the target node address, the input device is the relay node, and the relay node transmits the file delivery information to another communication node of the plurality of communication nodes.

14. The information transmission system as claimed in claim 10, wherein before the source node receives the file delivery information transmitted by the electronic device that is signally connected to the source node, the processing module of each input device obtains an updated connectable device information, and the source node obtains the target device information according to the updated the connectable device.

* * * * *